(12) United States Patent
Van Bosch et al.

(10) Patent No.: US 9,825,484 B2
(45) Date of Patent: Nov. 21, 2017

(54) MULTIPLE COIL STRUCTURE FOR SUPPORTING MULTIPLE TYPES OF WIRELESS CHARGING AND NEAR FIELD COMMUNICATIONS

(71) Applicant: Motorola Mobility LLC, Chicago, IL (US)

(72) Inventors: James A Van Bosch, Crystal Lake, IL (US); Pavel Shostak, Evanston, IL (US)

(73) Assignee: Motorola Mobility LLC, Chicago, IL (US)

( * ) Notice: Subject to any disclaimer, the term of this patent is extended or adjusted under 35 U.S.C. 154(b) by 7 days.

(21) Appl. No.: 14/835,149

(22) Filed: Aug. 25, 2015

(65) Prior Publication Data

US 2017/0063128 A1 Mar. 2, 2017

(51) Int. Cl.
*H02J 7/00* (2006.01)
*H02J 7/02* (2016.01)
(Continued)

(52) U.S. Cl.
CPC ............. *H02J 7/025* (2013.01); *H01F 38/14* (2013.01); *H02J 50/10* (2016.02); *H02J 50/27* (2016.02);
(Continued)

(58) Field of Classification Search
CPC .................................................... H02J 7/025
(Continued)

(56) References Cited

U.S. PATENT DOCUMENTS

| 2014/0210406 A1* | 7/2014 | Na | H02J 7/025 |
| | | | 320/108 |
| 2014/0375262 A1 | 12/2014 | Yamaguchi et al. | |
| 2015/0054455 A1* | 2/2015 | Kim | H02J 17/00 |
| | | | 320/108 |

FOREIGN PATENT DOCUMENTS

| EP | 2804290 A1 | 11/2014 |
| JP | 2010-283263 A | 12/2010 |

(Continued)

OTHER PUBLICATIONS

Extended European Search Report of European Patent Application No. 16185016.9-1804, Motorola Mobility LLC, dated Jan. 16, 2017.

*Primary Examiner* — Richard V Muralidar
(74) *Attorney, Agent, or Firm* — Watson Intellectual Property Group

(57) ABSTRACT

The present invention provides a multiple coil structure for supporting multiple types of charging and near field communications. The multiple coil structure includes an inner charging coil comprising a first conductor path forming one or more loops, wherein the direction of travel of the conductor path from an end point of the first conductor path is one of a substantially clockwise direction or a substantially counter-clockwise direction, and wherein the inner charging coil has an inner boundary and an outer boundary. The multiple coil structure further includes an outer charging coil comprising a second conductor path forming one or more loops, which extend around the outer boundary of the inner charging coil, wherein the direction of travel of the conductor path from an end point of the second conductor path is one of a substantially clockwise direction or a substantially counter-clockwise direction, and wherein the outer charging coil has an inner boundary and an outer boundary. The multiple coil structure still further includes a near field communication coil comprising a third conductor path form-
(Continued)

ing one or more loops within the inner boundary of the inner charging coil, wherein the direction of travel of the conductor path from an end point of the third conductor path is one of a substantially clockwise direction or a substantially counter-clockwise direction.

20 Claims, 7 Drawing Sheets

(51) Int. Cl.
*H01F 38/14* (2006.01)
*H04B 5/00* (2006.01)
*H02J 50/10* (2016.01)
*H02J 50/27* (2016.01)

(52) U.S. Cl.
CPC ......... *H04B 5/0037* (2013.01); *H04B 5/0087* (2013.01); *H02J 2007/0096* (2013.01)

(58) Field of Classification Search
USPC ........................................................ 320/108
See application file for complete search history.

(56) References Cited

FOREIGN PATENT DOCUMENTS

| | | |
|---|---|---|
| JP | 2013-169122 A | 8/2013 |
| JP | 2015-500622 A | 1/2015 |
| WO | 2013/157191 A1 | 10/2013 |
| WO | 2014/038265 A1 | 3/2014 |
| WO | 2015/147133 A1 | 10/2015 |

* cited by examiner

MULTIPLE COIL STRUCTURE FOR SUPPORTING MULTIPLE TYPES OF WIRELESS CHARGING AND NEAR FIELD COMMUNICATIONS

FIELD OF THE INVENTION

The present invention relates generally to portable electronic devices and the manner in which multiple coils are integrated in a similar space, and more particularly, to portable electronic devices which include respective coils for multiple types of wireless charging, as well as near field communications.

BACKGROUND OF THE INVENTION

Wireless charging of portable electronic devices is a feature that is increasingly being supported. While the technology has not yet been widely adopted, we are already starting to see the development of new forms of the technology, which have varying interface requirements. This creates challenges for device manufacturers, that need to decide how they are going to support a particular feature. More specifically, do you support the newer technology, the older technology, or both. If you shift your support to the newer technology, customers that adopted the older technology may be frustrated that previous charging investments may no longer be supported. In some cases, they may not be aware of the fact that there are multiple technologies, and that their new device may not function with their old charger, or vice versa. Consequently, there may be a motivation for manufacturers of wireless charging solutions to support multiple forms of a feature including both newer and older forms of a technology.

Still further, there is an incentive to try and make the experience associated with the same type of activity as similar as possible even though it may involve different forms of the technology, as users tend to develop habits in line with certain types of tasks. Correspondingly, there may be a motivation to try and co-locate disparate solutions including the operation and interface related to similar activities even if they use different technologies.

Another factor is the limited amount of device space available for supporting different types of device interactions. So, an ability to co-locate disparate solutions for related types of activities may be beneficial. Still further, given the limited device interface space, there may be a further desire to be able to co-locate still further forms of device interactions, such as support for near field communications proximate support for wireless charging solutions. At least one relatively widely accepted solution has placed support for near field communications proximate the back surface of the device. Similarly, at least some forms of wireless charging have also tended to interact with a device through the back surface of the device.

The present inventors have correspondingly recognized that coil designs that are adapted to solutions which integrate support for both near field communications, as well as multiple forms of wireless charging in the same or similar space would be beneficial.

SUMMARY OF THE INVENTION

The present invention provides a multiple coil structure for supporting multiple types of wireless charging and near field communications. The multiple coil structure includes an inner charging coil comprising a first conductor path forming one or more loops, wherein the direction of travel of the conductor path from an end point of the first conductor path is one of a substantially clockwise direction or a substantially counter-clockwise direction, and wherein the inner charging coil has an inner boundary and an outer boundary. The multiple coil structure further includes an outer charging coil comprising a second conductor path forming one or more loops, which extend around the outer boundary of the inner charging coil, wherein the direction of travel of the conductor path from an end point of the second conductor path is one of a substantially clockwise direction or a substantially counter-clockwise direction, and wherein the outer charging coil has an inner boundary and an outer boundary. The multiple coil structure still further includes a near field communication coil comprising a third conductor path forming one or more loops within the inner boundary of the inner charging coil, wherein the direction of travel of the conductor path from an end point of the third conductor path is one of a substantially clockwise direction or a substantially counter-clockwise direction.

In at least one embodiment, the third conductor path in addition to forming one or more loops within the inner boundary of the inner charging coil includes a section of conductor path that transitions to an area outside the outer boundary of the inner charging coil and inside the inner boundary of the outer charging coil, where the third conductor path includes one or more additional loops in substantially the same direction as the loops formed by the third conductor path within the inner boundary of the inner charging coil.

In at least a further embodiment, the third conductor path in addition to forming one or more loops within the inner boundary of the inner charging coil includes a section of conductor path that transitions to an area outside the outer boundary of the outer charging coil, where the third conductor path includes one or more additional loops in substantially the same direction as the loops formed by the third conductor path within the inner boundary of the inner charging coil.

The present invention further provides portable electronic device having wireless charging capabilities and near field communication capabilities. The portable electronic device includes a power storage element, one or more wireless charging circuits coupled to the power storage element, and a near field communication transceiver. The portable electronic device further includes a multiple coil structure. The multiple coil structure includes an inner charging coil comprising a first conductor path forming one or more loops, wherein the direction of travel of the conductor path from an end point of the first conductor path is one of a substantially clockwise direction or a substantially counter-clockwise direction, and wherein the inner charging coil has an inner boundary and an outer boundary. The multiple coil structure further includes an outer charging coil comprising a second conductor path forming one or more loops, which extend around the outer boundary of the inner charging coil, wherein the direction of travel of the conductor path from an end point of the second conductor path is one of a substantially clockwise direction or a substantially counter-clockwise direction, and wherein the outer charging coil has an inner boundary and an outer boundary. The multiple coil structure still further includes a near field communication coil comprising a third conductor path forming one or more loops within the inner boundary of the inner charging coil, wherein the direction of travel of the conductor path from an end point of the third conductor path is one of a substantially clockwise direction or a substantially counter-clockwise direction.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

Figure 1:
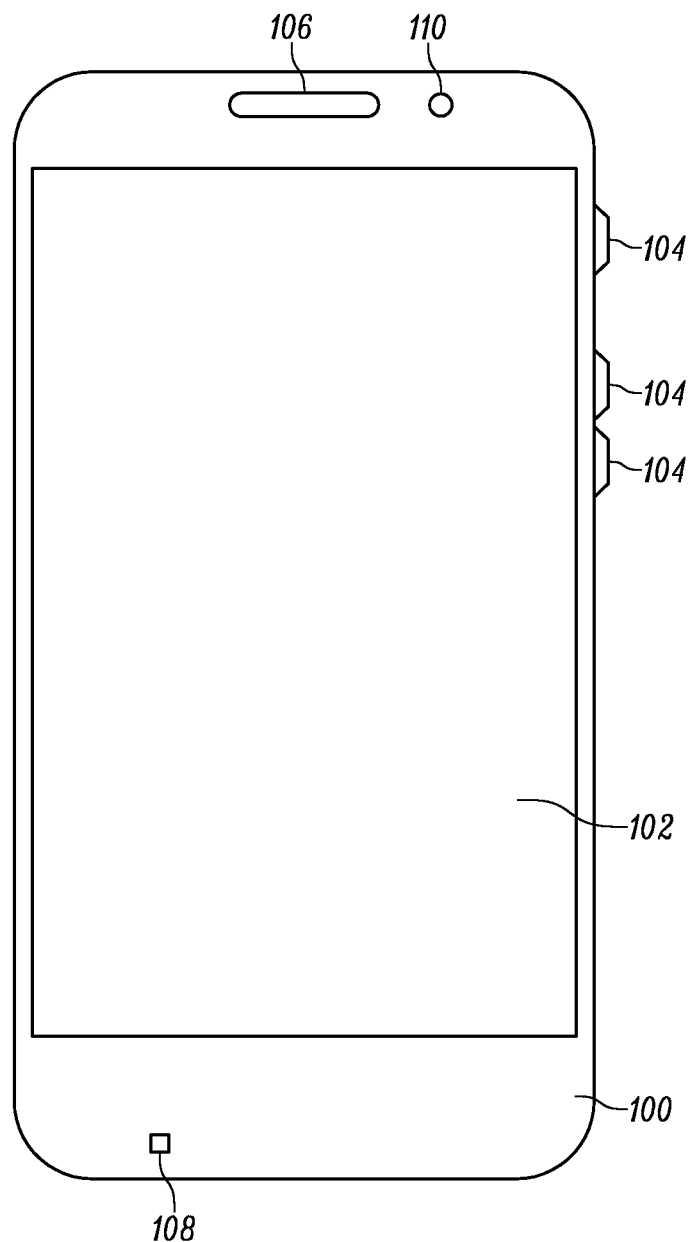
FIG. 1 is a front view of an exemplary hand held electronic device.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

FIG. 1 illustrates a front view of an exemplary hand held electronic device 100. While in the illustrated embodiment, the type of hand held electronic device shown is a radio frequency cellular telephone, which incorporates near field communication capabilities and wireless charging capabilities, other types of devices that incorporate near field communication capabilities and wireless charging capabilities are also relevant to the present application. In other words, the present application is generally applicable to hand held electronic devices beyond the type being specifically shown. A couple of additional examples of suitable hand held electronic devices that may additionally be relevant to the present application in the incorporation and management of multiple types of wireless charging and near field communications in a hand held electronic device can include a tablet, a cordless telephone, a selective call receiver, an audio player, a gaming device, a personal digital assistant, as well as any other form of hand held electronic device that one might at least sometimes carry around on one's person for which it might be desirable to wirelessly charge and/or engage in one or more forms of near field communications.

In the illustrated embodiment, the radio frequency cellular telephone includes a display 102 which covers a large portion of the front facing. In at least some instances, the display can incorporate a touch sensitive matrix, that facilitates detection of one or more user inputs relative to at least some portions of the display, including interaction with visual elements being presented to the user via the display 102. In some instances, the visual element could be an object with which the user can interact. In other instances, the visual element can form part of a visual representation of a keyboard including one or more virtual keys and/or one or more buttons with which the user can interact and/or select for actuation. In addition to one or more virtual user actuatable buttons or keys, the device 100 can include one or more physical user actuatable buttons 104. In the particular embodiment illustrated, the device has three such buttons located along the right side of the device.

The exemplary hand held electronic device, illustrated in FIG. 1, additionally includes a speaker 106 and a microphone 108 in support of voice communications. The speaker 106 may additionally support the reproduction of an audio signal, which could be a stand-alone signal, such as for use in the playing of music, or can be part of a multimedia presentation, such as for use in the playing of a movie, which might have at least an audio as well as a visual component. The speaker may also include the capability to also produce a vibratory effect. However, in some instances, the purposeful production of vibrational effects may be associated with a separate element, not shown, which is internal to the device. Generally, the speaker is located toward the top of the device, which corresponds to an orientation consistent with the respective portion of the device facing in an upward direction during usage in support of a voice communication. In such an instance, the speaker 106 might be intended to align with the ear of the user, and the microphone 108 might be intended to align with the mouth of the user. Also located near the top of the device, in the illustrated embodiment, is a front facing camera 110.

Figure 2:
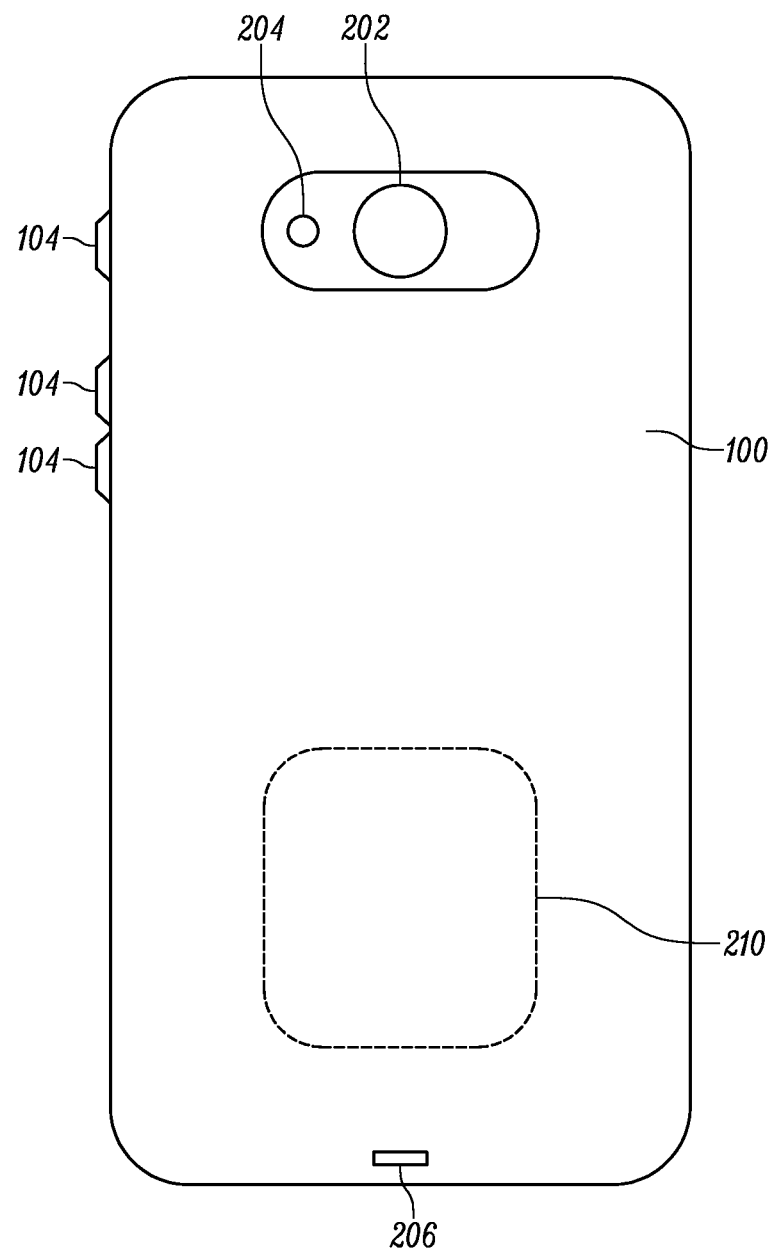
FIG. 2 is a back view of an exemplary hand held electronic device, which could correspond to the hand held electronic device illustrated in FIG. 1.

FIG. 2 illustrates a back view of the exemplary hand held electronic device 100, illustrated in FIG. 1. In the back view of the exemplary hand held electronic device, the three physical user actuatable buttons 104, which are visible in the front view, can similarly be seen. The exemplary hand held electronic device additionally includes a back side facing camera 202 with a flash 204, as well as a serial bus port 206, which is generally adapted for receiving a cable connection, which can be used to receive data and/or power signals. Still further, the illustrated embodiment includes an area 210 proximate the back side surface, within which one or more loop antennas for supporting such functions as near field communications and/or wireless charging. The one or more loop antennas can be located internal to the device, often just below the back side surface of the device 100.

Figure 3:
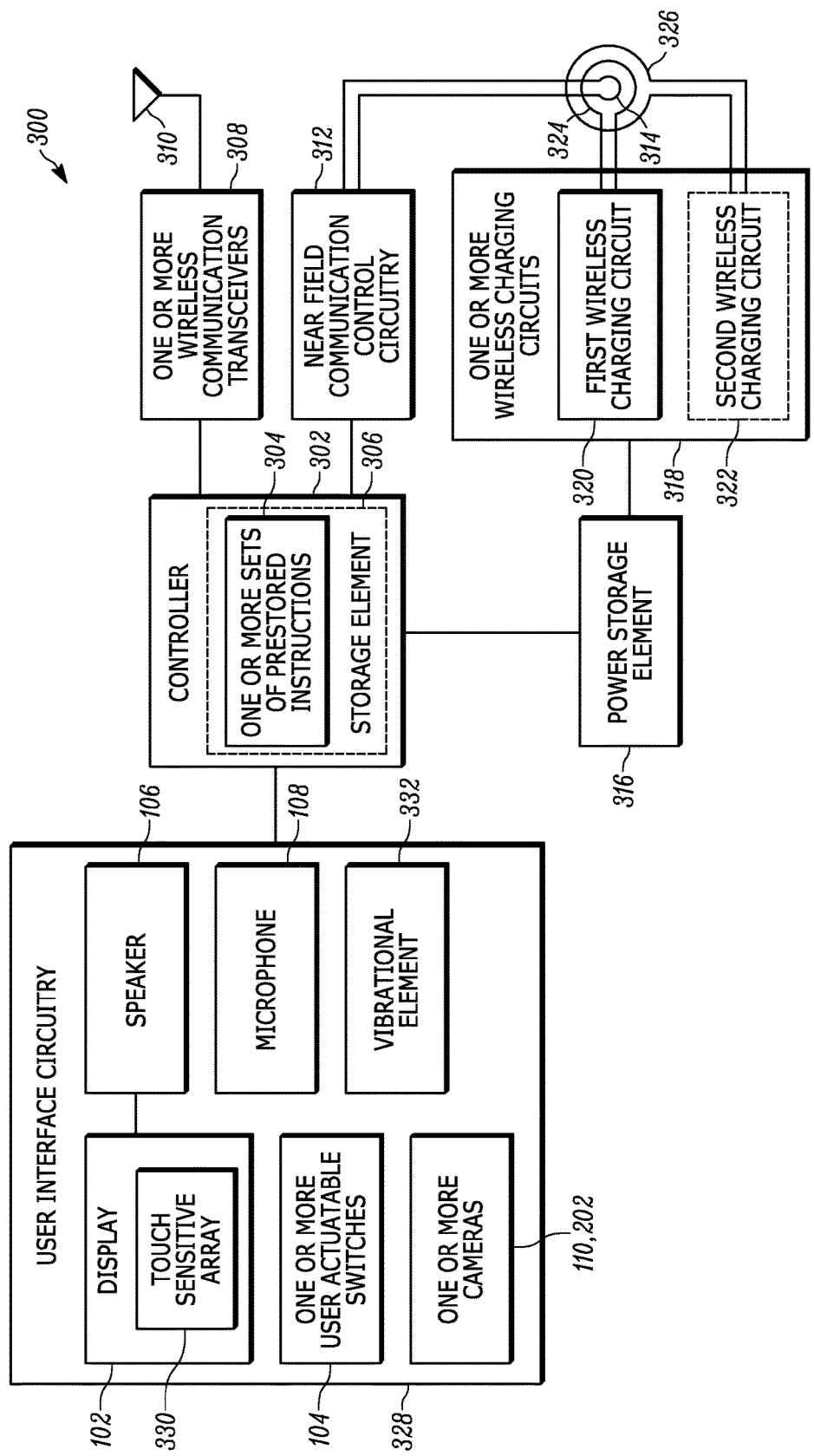
FIG. 3 is a block diagram of a hand held electronic device in accordance with at least one embodiment.

FIG. 3 illustrates a block diagram 300 of a hand held electronic device 100, in accordance with at least one embodiment. In the illustrated embodiment, the hand held electronic device 100 includes a controller 302, which is adapted for managing at least some of the operation of the device 100. In some embodiments, the controller 302 could be implemented in the form of one or more microprocessors, which are adapted to execute one or more sets of pre-stored instructions 304, which may be used to form or implement the operation of at least part of one or more controller modules. The one or more sets of pre-stored instructions 304 may be stored in a storage element 306, which while shown as being integrated as part of the controller 302, may additionally or alternatively include some data storage capability for storing at least some of the prestored instructions for use with the controller 302, that are separate from and coupled to the controller 302.

The storage element 306 could include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory stick. One skilled in the art will still further appreciate that still other further forms of storage elements could be used without departing from the teachings of the present disclosure. In the same or other instances, the controller 302 may additionally or alternatively incorporate state machines and/or logic circuitry, which can be used to implement at least partially, some of the modules and/or functionality associated with the controller 302.

In the illustrated embodiment, the device further includes one or more transceivers 308, which are coupled to the controller 302 and which serve to manage the external communication of data including their wireless communication using one or more forms of communications. In such an instance, the transceivers will generally each be coupled to a corresponding antenna 310 via which the wireless communication signals will be radiated and received. For example, the one or more transceivers 308 might include a receiver for supporting communications with a global positioning system, a transceiver for supporting cellular radio frequency communications, a transceiver for supporting Bluetooth® type communications, as well as a transceiver for supporting Wi-Fi® type communications. Transceivers for other forms of communication are additionally and/or alternatively possible. While each transceiver is often associated with a separate antenna, it is possible that some antennas may be able to support multiple forms of communication, as well as potentially some forms of near field communication. For example, in at least some instances, it is envisioned that an antenna that supports cellular communications may also support a single turn loop antenna design for use with some forms of near field communications including near field communications that might support and make use of active load modulation.

In addition to the one or more transceivers 308, the device 100 additionally includes near field communication control circuitry 312, which is coupled to respective antenna structure 314 for supporting near field communications. In at least some instances, chipsets may be available, which provide control circuitry 312 for supporting near field communications.

Still further, the hand held electronic device further includes a power storage element 316, such as a battery, capacitor or other such device for storing energy, which can be later used to provide electric power to the other circuit elements. In conjunction with being able to supply power to other circuit elements, the power storage element is able to receive power with at least some of the received power being available for later distribution. In at least some instances, the power received by the power storage element will be received from one or more charging circuits, such as one or more wireless charging circuits 318, as well as one or more wired connections, such as the previously noted serial bus port 206. In the illustrated embodiment, the device 100 can include at least a pair of wireless charging circuits 320 and 322, which can correspond to respective charging loops 324 and 326.

The charging loops are intended to couple either inductively or via a loosely coupled magnetic resonance to another corresponding related coil external to the device 100, which is properly tuned, whereby a change in current produced in a first one of the corresponding related coils will interact with the other related coil through an electromagnetic field, so as to induce a change in current in the other related coil. The induced change in current produced in the corresponding related coil can be used by the corresponding wireless charging circuit to produce power that can be used to power the electronic circuitry contained in the hand held electronic device, and/or supply power to or replenish power in the power storage element 316, which can be later used to supply power to the electronic circuitry of the hand held electronic device.

In the illustrated embodiment, the charging loops 324 and 326 are part of a multiple coil structure along with the antenna 314 associated with the near field communication control circuitry 312. The charging loops 324 and 326 and antenna 314, in at least some instances, form concentric loops which generally support communications and/or wireless charging proximate a common single portion of the surface area of the device. The common single portion of the surface area of the device, includes the one or more related charging loops and antennas being located at or near an external surface of the device, where in the illustrated embodiment, the respective loop structures are located just below a portion 210 of the external back surface of the device 100.

In the illustrated embodiment, the device 100 can additionally include user interface circuitry 328. For example, the user interface circuitry 328 can include a display 102, which may further support a touch sensitive array 330. The user interface circuitry may also include a speaker 106, a microphone 108, one or more user actuatable switches 104, a vibrational element 332, and one or more cameras 110, 202. Still further alternative and additional forms of user interface elements may be possible without departing from the teachings of the present invention.

Figure 4:
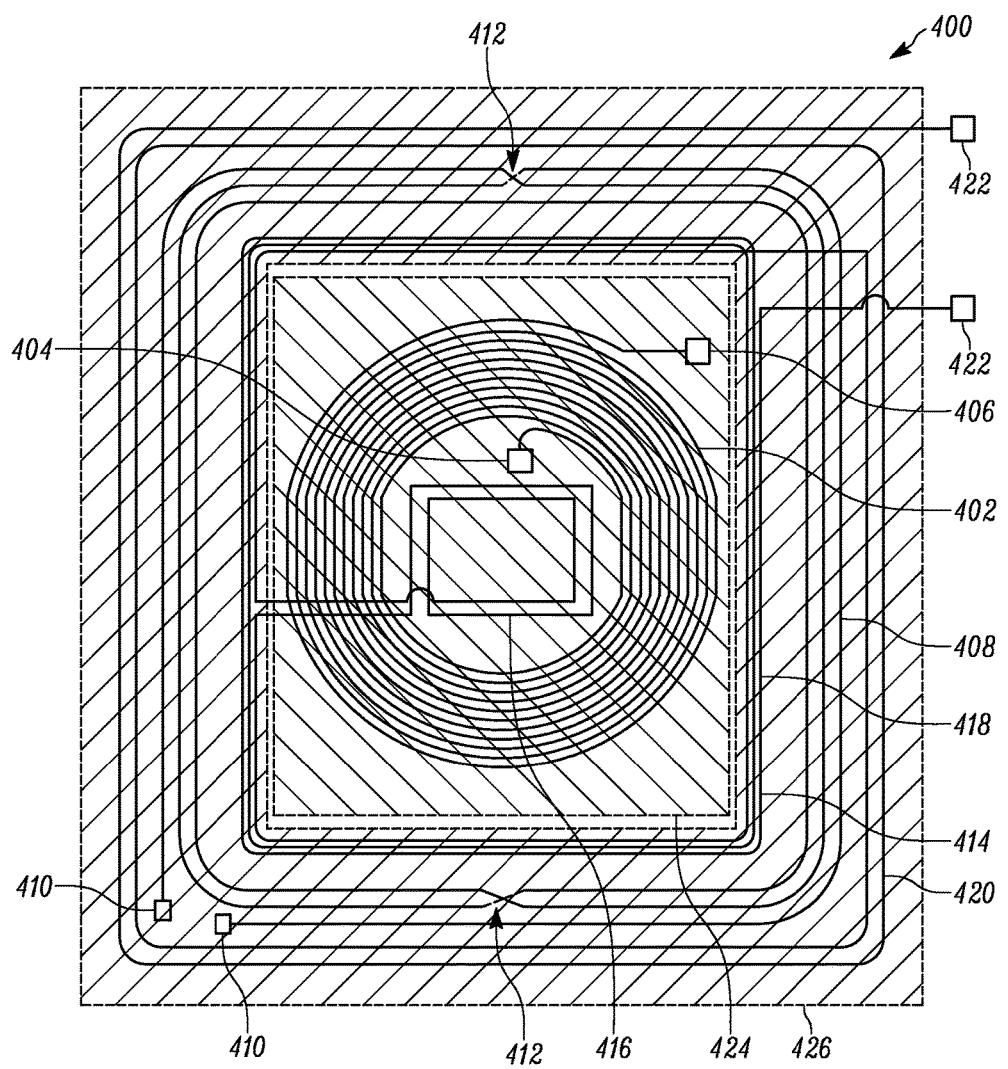
FIG. 4 is an exemplary layout for a multiple coil structure including multiple loop antennas, charging coils, and ferrite structures for supporting multiple types of wireless charging and near field communications, in accordance with at least one embodiment.

FIG. 4 illustrates an exemplary layout for a multiple coil structure 400 including multiple loop antennas, charging coils, and ferrite structures for supporting multiple types of wireless charging and near field communications, in accordance with at least one embodiment. More specifically, the multiple coil structure 400 includes an inner charging coil 402 comprised of a conductor path forming one or more loops. Generally, the loops will extend from one of two ends to the second of two ends in the same one of a clockwise or a counter-clockwise direction. For example, in the illustrated embodiment, the corresponding loops of the inner charging coil are seen as extending in a clockwise direction when viewed from the end 404 corresponding to the inside most loop to the end 406 corresponding to the outside most loop. The loops of the inner charging coil 402 are configured and dimensioned to have at least a desired degree of resonance with a coil associated with a separate external charger structure. Together, the inner charging coil 402 and the coil associated with a separate charger structure inductively couple to allow an electric current conveyed through the coil associated with the separate charger structure to induce an electric current in the inner charging coil 402 of the device 100.

The multiple coil structure 400 additionally includes an outer charging coil 408, which is located in an area outside of an outer boundary of the inside charging coil 402. The outer charging coil 408 similarly extends from one of two ends 410 in one of a clockwise or a counter-clockwise direction. By having a pair of crossover points 412 in the three loop structure, it is possible for the loop to have both of its ends 410 be located on the same outer side of the loop structure. The crossover can include a pair of vias and connecting conductor present on a different layer of the substrate upon which the conductor paths are located. It is also possible, that a wire conductor that can extend out of the planar layer of the substrate, which has respective ends coupled to alternative ones of a pair of through holes or mounting pads, which can traverse the in-plane trace conductor in a layer of the substrate and allow a crossing of the in-plane trace conductor without shorting to the same. Similar to the inner charging coil 402, The loops of the outer charging coil 408 are configured and dimensioned to have at least a desired degree of resonance with a coil associated with a separate external charger structure. Together, the outer charging coil 408 and the coil associated with a separate charger structure magnetically couple to allow an electric current conveyed through the coil associated with the separate charger structure to induce an electric current in the outer charging coil 408 of the device 100.

In the illustrated embodiment, the inner charging coil can be associated with a form of wireless charging often referred to as inductive wireless charging following one or more of at least two wireless standards including WPC (Wireless Power Consortium) Inductive, and PMA (Power Matters Alliance) Inductive. Such a charging type generally operates between 100 kHz and 300 kHz, and currently supports a transmitter power on the order of around 5 W. The outer charging coil, in the illustrated embodiment, can be associated with a form of wireless charging often referred to as resonant wireless charging, which could correspond to and/ or include a wireless charging standard, such as A4WP (Alliance for Wireless Power) Resonant. The identified resonant wireless charging standard operates at a frequency between 6 MHz and 7 MHz, and currently supports a transmitter power on the order of around 16 W. The resonant wireless charging standard further benefits from greater freedom of positioning of the two inductively coupled coils via which the power is transferred, and sometimes can include a bowl type structure within which the device to be charged can be received, as opposed to or in addition to a surface upon which a properly positioned and aligned device can be received.

In the illustrated embodiment, the multiple coil structure 400 still further includes a coil structure 414 for supporting near field communications. The coil structure 414 for supporting near field communications can include one or more sections. In the illustrated embodiment, the coil structure 414 includes three sections. A first section 416 includes the portion of the coil structure 414 that is located in the area inside an inner boundary area of the inner charging coil 402. A second section 418 includes the portion of the coil structure 414 that is located between the area outside of the outer boundary area of the inner charging coil 402, and inside the inner boundary area of the outer charging coil 408. A third section 420 includes the portion of the coil structure 414 that is located in the area outside the outer boundary area of the outer charging coil 408. Similar to the inner charging coil 402 and the outer charging coil 408, the coil structure generally follows one of a clockwise or a counter-clockwise direction as the conductor forming the coil structure extends between two ends 422 depending upon which end you start from.

The three sections of the coil structure 414 for supporting near field communications, illustrated in FIG. 4 are each adapted for targeting a different type of near field communications. For example, the first section 416, or inner portion, is adapted to better interact with near field communication tags including tags associated with accessory devices, such as Bluetooth® headsets. The corresponding near field communications between the accessory and the device can in turn help support a pairing of the accessory with the device 100. In at least some instances, the first section 416, or inner portion, will have coil diameters consistent with a range between approximately 10 mm and 15 mm. The second section 418, or middle portion, is adapted to better interact with forms of near field communication associated with payment terminals. In at least some instances, the second section 418 will have coil diameters consistent with a range between approximately 45 mm and 50 mm. The third section 420, or outer portion, is adapted to better interact with near field communications associated with readers in transportation systems. In at least some instances, the third section 420 will have coil diameters consistent with a range between approximately 60 mm and 65 mm.

The multiple coil structure 400 can additionally include one or more ferrite elements, that are proximate one or more of the various coils, which are included as part of the multiple coil structure. The multiple coils as part of their inductive coupling will have an associated magnetic field. The ferrite elements are intended to provide a tuned return path, which is intended to help steer the location and direction of the corresponding field lines. In selecting the nature of the ferrite elements, one looks at magnetic permeability of the ferrite material at various frequencies of interest. In some instances the corresponding ferrite element can be associated with multiple coils, where each of the associated coils will have differing geometries as well as differing frequencies of operation. In such an instance, it may be necessary to make compromises relative to the features of the ferrite element to support potentially varying operational characteristics of the multiple associated coils.

In the illustrated embodiment, the multiple coil structure 400 includes a first ferrite element 424 associated with the inner charging coil 402 and the first section 416, of the coil structure 414 for supporting near field communications. The first ferrite element 424 in the exemplary embodiment is associated with a first hatched area. A second ferrite element 426 is associated with the outer charging coil 408, as well as the second 418 and third 420 sections of the coil structure 414 for supporting near field communications. The second ferrite element 426 is associated with an a second hatched area. In the illustrated embodiment, the first ferrite element 424 takes into account the features of inductive charging associated with the inner charging coil in selecting the type of material, as well as the size and thickness of the material used. The second ferrite element 426 takes into account the features associated with resonant charging, as well as at least some aspects of the near field communications in selecting the type of material, as well as the size and thickness of the material used.

Figure 5:
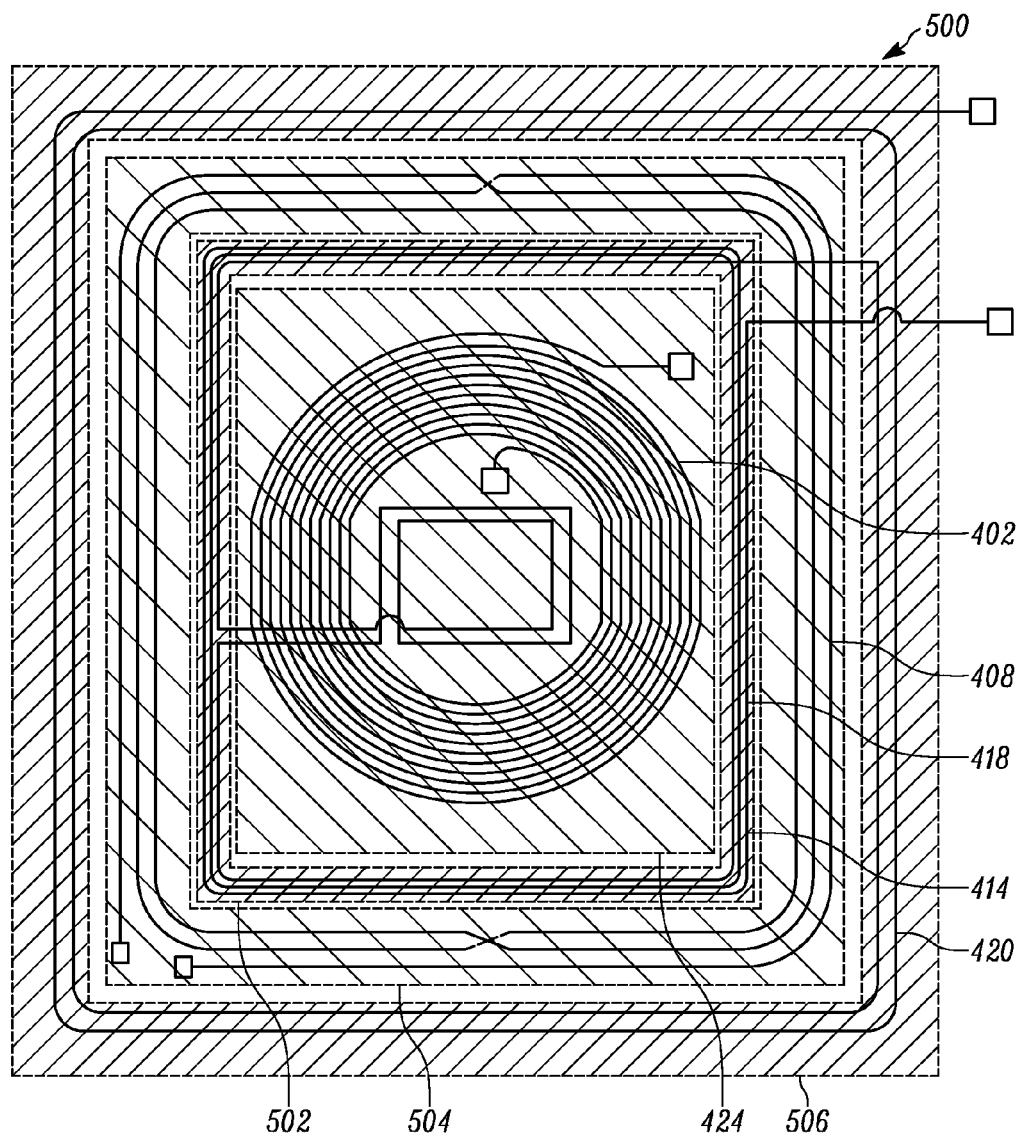
FIG. 5 is an exemplary layout for a multiple coil structure including multiple loop antennas, charging coils, and ferrite structures for supporting multiple types of wireless charging and near field communications, in accordance with at least a further embodiment.

FIG. 5 is an exemplary layout for a multiple coil structure 500 including multiple loop antennas, charging coils, and ferrite structures for supporting multiple types of wireless charging and near field communications, in accordance with at least a further embodiment. In the embodiment illustrated in FIG. 5, the coil structures are substantially the same as the structure illustrated in FIG. 4. However, the further embodiment provides a still further approach to providing supportive ferrite elements. While FIG. 4 included a structure having two ferrite elements, FIG. 5 represents an embodiment which includes four ferrite elements. In this alternative embodiment, a first ferrite element 424 is similar to the first ferrite element discussed in FIG. 4, which is associated with the inner charging coil 402 and the first section 416, of the coil structure 414 for supporting near field communications. A second ferrite element 502 is associated with the second section 418, of the coil structure 414 for supporting near field communications. A third ferrite element 504 is associated with the outer charging coil 408, and a fourth ferrite element 506 is associated with the third section 420, of the coil structure 414 for supporting near field communications. In this way compromises associated with the second ferrite element 426, illustrated in FIG. 4, in connection with supporting both resonant charging and near field communications can be minimized and/or avoided. In at least some instances, the type of material selected for both the second 502 and fourth 506 ferrite element can be the same or substantially similar.

Figure 6:
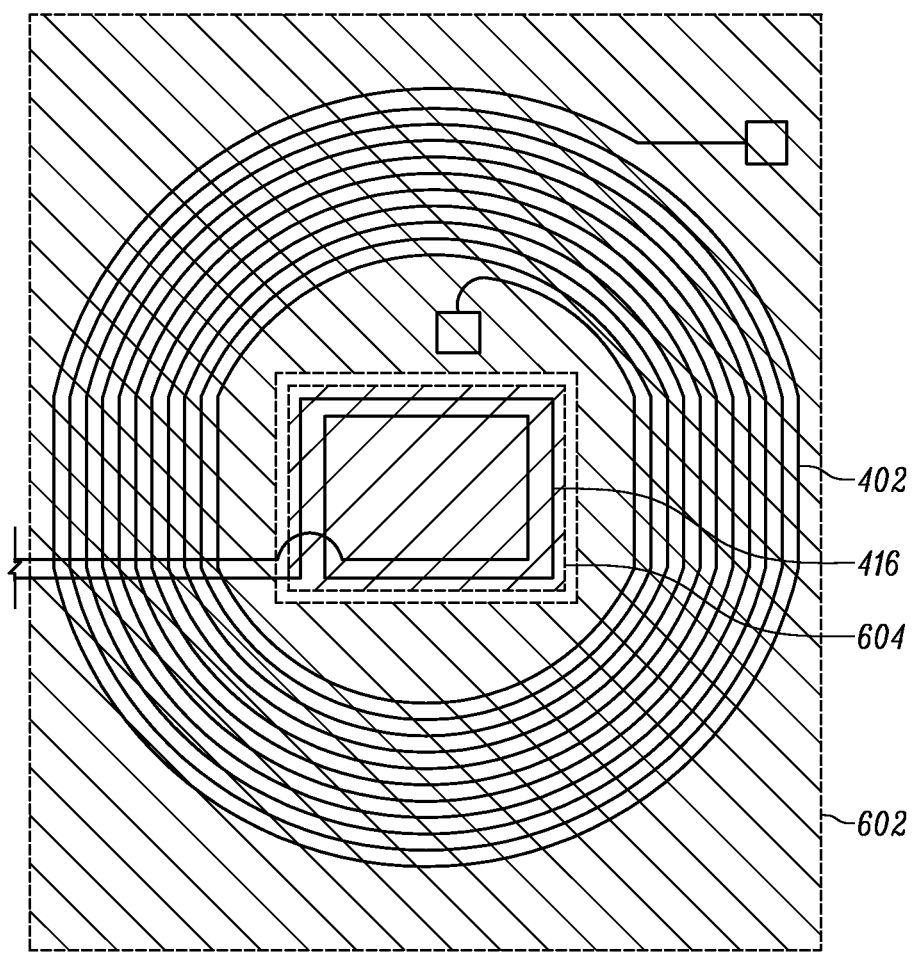
FIG. 6 is a partial exemplary layout for a multiple coil structure including ferrite structures and at least one loop antenna portion for supporting near field communication and at least one charging coil portion for supporting wireless charging, in accordance with at least one embodiment.
Figure 7:
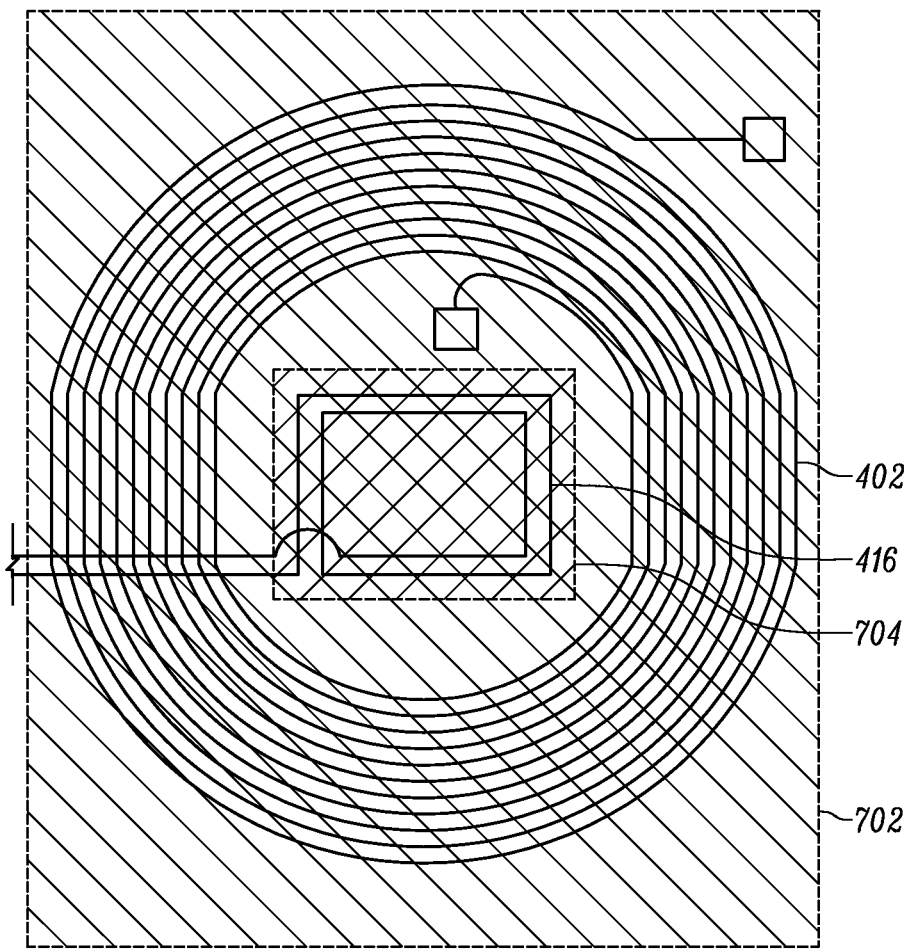
FIG. 7 is a partial exemplary layout for a multiple coil structure including ferrite structures and at least one loop antenna portion for supporting near field communication and at least one charging coil portion for supporting wireless charging, in accordance with at least a further embodiment.

FIGS. 6 and 7 are partial exemplary layouts for a multiple coil structure including ferrite structures and at least one loop antenna portion for supporting near field communication and at least one charging coil portion for supporting wireless charging, in accordance with at least one embodiment. More specifically, the ferrite structures are associated with the inner charging coil 402 and the first section 416 of the coil structure 414 for supporting near field communications. In each instance, a pair of ferrite structures 602 and 604 are shown, relative to this portion of the multiple coil structure. In FIG. 6, the second ferrite element 604 is shown inset into an internal cut out or opening in the first ferrite element 602. Alternatively, in FIG. 7, the second ferrite element 704 is shown stacked on top of the first ferrite element 702, where in FIG. 7, the first ferrite element does not have a cut out or opening within which the first ferrite element can be received. In these ways, a more customized or tuned ferrite structure can be provided which supports the alternative operational requirements of the inductive charging of the inner charging coil, relative to the near field communication of the first section 416 of the coil structure 414.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A multiple coil structure for supporting multiple types of charging and near field communications comprising:
   an inner charging coil comprising a first conductor path forming one or more loops, wherein the direction of travel of the conductor path from an end point of the first conductor path is one of a substantially clockwise direction or a substantially counter-clockwise direction, and wherein the inner charging coil has an inner boundary and an outer boundary;
   an outer charging coil comprising a second conductor path forming one or more loops, which extend around the outer boundary of the inner charging coil, wherein the direction of travel of the conductor path from an end point of the second conductor path is one of a substantially clockwise direction or a substantially counter-clockwise direction, and wherein the outer charging coil has an inner boundary and an outer boundary; and
   a near field communication coil comprising a third conductor path forming one or more loops within the inner boundary of the inner charging coil, wherein the direction of travel of the conductor path from an end point of the third conductor path is one of a substantially clockwise direction or a substantially counter-clockwise direction, and wherein the third conductor path in addition to forming one or more loops within the inner boundary of the inner charging coil includes a section of conductor path that transitions to an area outside the outer boundary of the inner charging coil, where the portion of the third conductor path outside the outer boundary of the inner charging coil includes one or more additional loops in substantially the same direction as the one or more loops formed by the portion of the third conductor path within the inner boundary of the inner charging coil.

2. A multiple coil structure in accordance with claim 1, wherein the section of the third conductor path that transitions to an area outside the outer boundary of the inner charging coil includes the one or more additional loops that are also inside the inner boundary of the outer charging coil.

3. A multiple coil structure in accordance with claim 1, wherein the section of the third conductor path that transitions to an area outside the outer boundary of the inner charging coil includes the one or more additional loops that are also outside the outer boundary of the outer charging coil.

4. A multiple coil structure in accordance with claim 1, wherein the section of the third conductor path that transitions to an area outside the outer boundary of the inner charging coil includes at least some of the one or more additional loops that are inside the inner boundary of the outer charging coil and at least some of the one or more additional loops that are outside the outer boundary of the outer charging coil.

5. A multiple coil structure in accordance with claim 4, further comprising:
   a first ferrite, which is positioned beneath the respective coils and portions thereof found in the area which encompasses the inner charging coil, and the portion of the near field communication coil located within the inner boundary of the inner charging coil; and
   a second ferrite of a type different than the first ferrite, where the second ferrite is positioned beneath the respective coils and portions thereof found in the area which encompasses the outer charging coil, and the portion of the near field communication coil located outside the outer boundary of the inner charging coil.

6. A multiple coil structure in accordance with claim 4, further comprising:
   a first ferrite, which is positioned beneath the respective coils and portions thereof found in the area which encompasses the inner charging coil, and the portion of the near field communication coil located within the inner boundary of the inner charging coil;
   a second ferrite of a type different than the first ferrite, where the second ferrite is positioned beneath the respective coils found in the area which encompasses the outer charging coil;
   a third ferrite of a type different than the first ferrite and the second ferrite, where the third ferrite is positioned beneath the respective coils and portions thereof found in the area which encompasses the portion of the near field communication coil located outside the outer boundary of the inner charging coil and inside the inner boundary of the outer charging coil; and a fourth ferrite of a type similar to the third ferrite, where the fourth ferrite is positioned beneath the respective coils and portions thereof found in the area which encompasses the portion of the near field communication coil located outside the outer boundary of the outer charging coil.

7. A multiple coil structure in accordance with claim 1, wherein the end points of the first conductor path and the second conductor path, respectively corresponding to the inner charging coil and the outer charging coil, each form terminals for interacting with a corresponding charging circuit.

8. A multiple coil structure in accordance with claim 1, wherein the inner charging coil is an inductive charging coil.

9. A multiple coil structure in accordance with claim 1, wherein the outer charging coil is a resonant charging coil.

10. A multiple coil structure in accordance with claim 1, further comprising:
a first ferrite, which is positioned beneath the respective coils and portions thereof found in the area which encompasses the inner charging coil; and
a second ferrite of a type different than the first ferrite, where the second ferrite is positioned beneath the respective coils and portions thereof found in the area of the near field communication coil located within the inner boundary of the inner charging coil.

11. A multiple coil structure in accordance with claim 1, further comprising:
a first ferrite, which is positioned beneath the respective coils and portions thereof found in the area which encompasses the inner charging coil, and the portion of the near field communication coil located within the inner boundary of the inner charging coil; and
a second ferrite of a type different than the first ferrite, where the second ferrite is positioned beneath the respective coils and portions thereof found in the area of the near field communication coil located within the inner boundary of the inner charging coil.

12. A multiple coil structure for supporting multiple types of charging and near field communications comprising:
an inner charging coil comprising a first conductor path forming one or more loops, wherein the direction of travel of the conductor path from an end point of the first conductor path is one of a substantially clockwise direction or a substantially counter-clockwise direction, and wherein the inner charging coil has an inner boundary and an outer boundary;
an outer charging coil comprising a second conductor path forming one or more loops, which extend around the outer boundary of the inner charging coil, wherein the direction of travel of the conductor path from an end point of the second conductor path is one of a substantially clockwise direction or a substantially counter-clockwise direction, and wherein the outer charging coil has an inner boundary and an outer boundary; and
a near field communication coil comprising a third conductor path forming one or more loops within the inner boundary of the inner charging coil, wherein the direction of travel of the conductor path from an end point of the third conductor path is one of a substantially clockwise direction or a substantially counter-clockwise direction;
wherein the third conductor path in addition to forming one or more loops within the inner boundary of the inner charging coil includes a section of conductor path that transitions to an area outside the outer boundary of the inner charging coil and inside the inner boundary of the outer charging coil, where the third conductor path includes one or more additional loops in substantially the same direction as the loops formed by the third conductor path within the inner boundary of the inner charging coil; and wherein the third conductor path includes a section of conductor path that transitions to an area outside the outer boundary of the outer charging coil, where the third conductor path includes one or more additional loops in substantially the same direction as the loops formed by the third conductor path within the inner boundary of the inner charging coil; and
wherein the portion of the near field communication coil in each respective area is adapted to target a different type of communication.

13. A multiple coil structure in accordance with claim 12, wherein the portion of the near field communication coil located within the inner boundary of the inner charging coil is adapted for interacting with near field communication tags.

14. A multiple coil structure in accordance with claim 12, wherein the portion of the near field communication coil located outside the outer boundary of the inner charging coil and within the inner boundary of the outer charging coil is adapted for interacting with near field communication payment terminals.

15. A multiple coil structure in accordance with claim 12, wherein the portion of the near field communication coil located outside the outer boundary of the outer charging coil is adapted for interacting with near field communication transportation readers.

16. A portable electronic device having wireless charging capabilities and near field communication capabilities, the portable electronic device comprising:
a power storage element;
one or more wireless charging circuits coupled to the power storage element;
a near field communication transceiver; and
a multiple coil structure including
an inner charging coil coupled to a corresponding one of the wireless charging circuits, the inner charging coil comprising a first conductor path forming one or more loops, wherein the direction of travel of the conductor path from an end point of the first conductor path is one of a substantially clockwise direction or a substantially counter-clockwise direction, and wherein the inner charging coil has an inner boundary and an outer boundary,
an outer charging coil coupled to a corresponding one of the wireless charging circuits, the outer charging coil comprising a second conductor path forming one or more loops, which extend around the outer boundary of the inner charging coil, wherein the direction of travel of the conductor path from an end point of the second conductor path is one of a substantially clockwise direction or a substantially counter-clockwise direction, and wherein the outer charging coil has an inner boundary and an outer boundary, and
a near field communication coil coupled to the near field communication transceiver, the near field communication coil comprising a third conductor path forming one or more loops within the inner boundary of the inner charging coil, wherein the direction of travel of the conductor path from an end point of the third conductor path is one of a substantially clockwise direction or a substantially counter-clockwise direction, and wherein the third conductor path in addition to forming one or more loops within the inner boundary of the inner charging coil includes a section of conductor path that transitions to an area outside the outer boundary of the inner charging coil, where the portion of the third conductor path outside the outer boundary of the inner charging coil includes one or more additional loops in substantially the same direction as the one or more loops formed by the portion of the third conductor path within the inner boundary of the inner charging coil.

17. A portable electronic device in accordance with claim 16, wherein the device includes a front side surface and a back side surface, where the front side surface includes a display, and the multiple coil structure is proximate the back side surface.

18. A portable electronic device in accordance with claim 16, wherein the section of the third conductor path that transitions to an area outside the outer boundary of the inner charging coil includes the one or more additional loops that are also and inside the inner boundary of the outer charging coil.

19. A portable electronic device in accordance with claim 16, wherein the section of the third conductor path that transitions to an area outside the outer boundary of the inner charging coil includes the one or more additional loops that are also outside the outer boundary of the outer charging coil.

20. A portable electronic device in accordance with claim 16, wherein the section of the third conductor path that transitions to an area outside the outer boundary of the inner charging coil includes at least some of the one or more additional loops that are inside the inner boundary of the outer charging coil and at least some of the one or more additional loops that are outside the outer boundary of the outer charging coil.

* * * * *